3,294,560
BRONZE-SMOKE SEGMENT GLASS
James E. Duncan, Natrona Heights, and Joseph E. Cooper, Brackenridge, Pa., assignors to Pittsburgh Plate Glass Company, Pittsburgh, Pa., a corporation of Pennsylvania
No Drawing. Filed Mar. 5, 1965, Ser. No. 437,582
5 Claims. (Cl. 106—54)

The present invention relates to new segment glasses used in the fabrication of fused uniform color bifocal and trifocal ophthalmic lenses. More particularly, the present invention relates to lead-barium bronze-smoke colored segment glasses having indices of refraction of 1.6530 to 1.6610 and total luminous transmittances of about 25 percent for a 2 millimeter glass thickness.

The lead-barium bronze-smoke colored segment glasses of the present invention have indices of refraction, softening points, and thermal expansion characteristics which make them suitable for fusing to the bronze-smoke colored crown glasses disclosed in our copending application Serial No. 420,793, filed December 23, 1964.

The segment glasses of the present invention permit fabrication of bifocal or trifocal ophthalmic lenses which exhibit essentially uniform color density and transmittance properties when fused to the bronze-smoke colored segment and crown glasses disclosed in our copending applications.

The glasses of the present invention are described by the calculated compositional ranges presented below:

| Component: | Percent by weight |
|---|---|
| $SiO_2$ | 37 to 41 |
| $BaO$ | 17 to 21 |
| $Na_2O$ | 6 to 10 |
| $K_2O$ | 0 to 2 |
| $B_2O_3$ | 1 to 4 |
| $CaO$ | 2 to 5 |
| $TiO_2$ | 1 to 5 |
| $ZrO_2$ | 4 to 8 |
| $PbO$ | 15.5 to 18 |
| $Sb_2O_5$ | 0 to 2 |
| $Al_2O_3$ | .1 to 3.0 |
| $CoO$ | .001 to .077 |
| $NiO$ | .1 to .4 |

The batch ingredients for two typical segment glasses of the present invention are given in Table I below. All ingredients are given in parts by weight.

TABLE I

| Batch ingredient | Parts by Weight | |
|---|---|---|
| | "A" | "B" |
| Sand | 937 | 963 |
| Barium Carbonate | 650 | 702 |
| Soda Ash | 355 | 362 |
| Sodium Nitrate | 30 | 30 |
| Boric Acid | 124 | 143 |
| Calcium Carbonate | 182 | 169 |
| Titanium Dioxide | 73 | 102 |
| Zirconium Silicate | 262 | 260 |
| Lead Oxide | 435 | 463 |
| Antimony Oxide | 10 | 10 |
| Nickel Oxide | 7.2 | 7.55 |
| Cobalt Oxide | 0.106 | 0.112 |

The calculated glass compositions "A" and "B" are presented in Table II. All oxide percentages are in percent by weight.

TABLE II

| Component | Percent by Weight | |
|---|---|---|
| | Composition "A" | Composition "B" |
| $SiO_2$ | 39.2 | 38.1 |
| $BaO$ | 19.3 | 19.5 |
| $Na_2O$ | 8.3 | 8.1 |
| $B_2O_3$ | 2.7 | 3.0 |
| $CaO$ | 3.9 | 3.5 |
| $TiO_2$ | 2.8 | 3.7 |
| $ZrO_2$ | 6.5 | 6.4 |
| $PbO$ | 16.7 | 17.0 |
| $Sb_2O_5$ | 0.4 | 0.4 |
| $Al_2O_3$ | 0.1 | 0.1 |
| $CoO$ | 0.0041 | 0.0041 |
| $NiO$ | 0.2756 | 0.2756 |

Table III lists some of the significant optical and physical properties of glasses "A" and "B."

TABLE III

| Property | Composition "A" | Composition "B" |
|---|---|---|
| Index of refraction, $N_d$ | 1.6534 | 1.6603 |
| Softening point in degrees F | 1268 | 1267 |
| Coefficient of thermal expansion $\times 10^{-6}$ per ° F. between 70° F. and 575° F | 5.1 | 5.1 |
| Percent luminous transmittance for 2 mm. glass thickness | 25.0 | 25.0 |

The glasses of the present invention may have indices of refraction between 1.6530 and 1.6610, softening points from 1260 to 1310° F., and coefficients of thermal expansion between $4.8 \times 10^{-6}$ per ° F. and $5.3 \times 10^{-6}$ per ° F. in the temperature range from 70° F. to 575° F.

The softening point is defined by the American Society for Testing Materials as the temperature at which the viscosity of the glass is $10^{7.6}$ poises.

The segment glasses herein disclosed should be melted under neutral or slightly oxidizing conditions using conventional melting techniques.

The present invention will be more fully understood by reference to the following detailed example which is the preferred method contemplated by the inventor for carrying out his invention on a small scale:

*Example I*

An 18-pound batch of the dry raw materials indicated under "A" in Table I was weighed. The raw batch materials were mixed and approximately half of the batch was charged into a preheated ceramic crucible for melting. The crucible was then placed in a furnace and heated to a temperature of about 2450° F. for a period of two hours. The furnace temperature was then raised to 2500° F. and the remaining batch was charged and melted. The molten glass was then mechanically stirred for an hour to homogenize and fine the glass. Stirring was continued for an additional 1½ hours during which time the furnace temperature was reduced to 2000° F. During the next hour the temperature was lowered and held at about 1950° F. the glass was then removed from the furnace and poured from the crucible onto a preheated iron table. The glass was rolled to form a plate of glass approximately 12 inches by 20 inches by ⅜ inch thick. After the cast glass plate had sufficiently solidified in air, it was placed in a kiln preheated to 1100° F. The glass plate was annealed in the kiln by cooling from 1100° F. to 850° F. at a rate of approximately 3° F. per minute. The power to the kiln was then turned off and the kiln was allowed to cool gradually to room temperature over a period of about 15 hours.

The annealed glass may be fabricated for use as a segment glass in the manufacture of a bronze-smoke multifocal lens blank. The bronze-smoke major portion of the multifocal lens blank has the following calculated composition:

| Component: | Percent by weight |
|---|---|
| $SiO_2$ | 69.2 |
| $Na_2O$ | 6.3 |
| $K_2O$ | 9.9 |
| $ZnO$ | 6.7 |
| $BaO$ | 1.5 |
| $Al_2O_3$ | 0.6 |
| $Fe_2O_3$ | 5.1 |
| $CoO$ | 0.0112 |
| $Se$ | 0.0940 |
| $Sb_2O_5$ | 0.6 |

Such a glass is disclosed in our copending application Serial No. 420,793, file December 12, 1964.

A conventional method of fabricating fused bifocal ophthalmic lenses is to form a composite button by fusing a small segment of a crown glass having the same composition as the major lens blank to a glass segment such as glass "A" of the present invention in an edge-to-edge relationship. This composite button is then ground and polished to present a smooth, curved surface on one side thereof. A major crown blank is finished with a ground and polished recessed portion on its convex side conforming to the ground and polished surface of the composite button. The button and the major blank are then brought together and heated to a temperature sufficient to fuse them together.

A method of fabricating a bifocal lens is disclosed in U.S. 2,112,659, issued to E. J. Reh on March 29, 1938.

A method of fabricating a fused trifocal lens is also disclosed in the same patent. In the trifocal lens the segment glass of the present application is used as the lower segment of the composite button.

The crown glass blank to which the segment glass of the present invention is fused to form a bifocal lens should have a softening point of about 1322° F., an index of refraction of about 1.5230, a coefficient of thermal expansion of about $4.9 \times 10^{-6}$ per ° F. over a temperature range of 70° F. to 575° F. and a bronze-smoke color similar to that of the segment glass.

The thermal expansion properties of the glasses employed in the manufacture of the multifocal lenses must be similar to prevent stresses being created in the finished composite lenses.

It is preferred that the segment glass have a softening point somewhat lower than that of the crown glass to which it is fused.

While the present invention has been described by reference to specific glass compositions the scope of the present invention should be limited only by the language of the appended claims.

We claim:

1. A bronze-smoke glass consisting in its essential ingredients of 37 to 41 percent $SiO_2$, 17 percent to 21 percent $BaO$, 6 to 10 percent $Na_2O$, 0 to 2 percent $K_2O$, 1 to 4 percent $B_2O_3$, 2 to 5 percent $CoO$, 1 to 5 percent $TiO_2$, 4 to 8 percent $ZrO_2$, 15.5 to 18 percent $PbO$, 0 to 2 percent $Sb_2O_5$, 0.1 to 3.0 percent $Al_2O_3$, .001 to .007 percent $CoO$, and 0.1 to 0.4 percent $NiO$, and which exhibits a softening point between 1260° F. and 1310° F., an index of refraction between 1.6530 and 1.6610, and a total luminous transmittance of 23 to 27 percent for a thickness of 2 millimeters.

2. A broze-smoke glass consisting essentially in percent by weight of 39.2 percent $SiO_2$, 19.3 percent $BaO$, 8.3 percent $Na_2O$, 2.7 percent $B_2O_3$, 3.9 percent $CaO$, 2.8 percent $TiO_2$, 6.5 percent $ZrO_2$, 16.7 percent $PbO$, 0.4 percent $Sb_2O_5$, 0.1 percent $Al_2O_3$, .0041 percent $CoO$, and .2756 percent $NiO$.

3. A bronze-smoke glass consisting essentially in percent by weight of 38.1 percent $SiO_2$, 19.5 percent $BaO$, 8.1 percent $Na_2O$, 3.0 percent $B_2O_3$, 3.5 percent $CaO$, 3.7 percent $TiO_2$, 6.4 percent $ZrO_2$, 17.0 percent $PbO$, 0.4 percent $Sb_2O_5$, 0.1 percent $Al_2O_3$, .0041 percent $CoO$, and 0.2756 percent $NiO$.

4. A multifocal opthalmic lens in which the fused segment glass has the calculated glass composition of claim 2.

5. A multifocal opthalmic lens in which the fused segment glass has the calculated glass composition of claim 3.

References Cited by the Examiner

UNITED STATES PATENTS

| 2,682,134 | 6/1954 | Stookey | 106—52 |
| 2,913,345 | 11/1959 | Duncan | 106—52 |
| 3,138,467 | 6/1964 | Seymour | 106—53 |

TOBIAS E. LEVOW, *Primary Examiner.*

H. McCARTHY, *Assistant Examiner.*

UNITED STATES PATENT OFFICE

CERTIFICATE OF CORRECTION

Patent No. 3,294,560　　　　　　　　　　　　December 27, 1966

James E. Duncan et al.

It is hereby certified that error appears in the above numbered patent requiring correction and that the said Letters Patent should read as corrected below.

Column 4, line 14, for "CoO" read -- CaO --; line 22, for "broze-smoke" read -- bronze-smoke --.

Signed and sealed this 23rd day of July 1968.

(SEAL)
Attest:

Edward M. Fletcher, Jr.

Attesting Officer

EDWARD J. BRENNER

Commissioner of Patents